United States Patent [19]

Kawaguchi et al.

[11] Patent Number: 4,579,515
[45] Date of Patent: Apr. 1, 1986

[54] PLASTICATING CONTROL APPARATUS FOR INJECTION MACHINE

[75] Inventors: Toshiro Kawaguchi; Kiyoshi Hashimoto, both of Yamaguchi, Japan

[73] Assignee: Ube Industries, Ltd., Japan

[21] Appl. No.: 713,789

[22] Filed: Mar. 20, 1985

[30] Foreign Application Priority Data

Mar. 26, 1984 [JP] Japan ................ 59-56160

[51] Int. Cl.$^4$ .............................. B29F 1/06
[52] U.S. Cl. ................... 425/136; 425/145; 425/149
[58] Field of Search ............ 425/145, 149, 136

[56] References Cited

U.S. PATENT DOCUMENTS

| | | | |
|---|---|---|---|
| 3,357,049 | 12/1967 | Spindler | 425/149 X |
| 3,721,512 | 3/1973 | Ma et al. | 425/149 |
| 4,161,380 | 7/1979 | Bishop | 425/145 |
| 4,411,609 | 10/1983 | Yoshii et al. | 425/149 |

Primary Examiner—J. Howard Flint, Jr.
Attorney, Agent, or Firm—Remy J. VanOphem

[57] ABSTRACT

A plasticating control apparatus for an in-line screw type injection machine, including a resin pressure sensor for detecting as an electrical signal pressure of a molten material at a distal end of a heating cylinder during plastication; means for directly converting the rotational speed of an electric motor to reciprocal movement of a hydraulic piston for driving a screw; and a control circuit for receiving the electrical signal from the resin pressure sensor and supplying the control signal to the electric motor in accordance with the electrical signal, the control signal supplied from the control circuit to the electric motor being adapted to control the rotational speed of the electric motor and hence a backward speed of the screw such that the pressure of the molten material at the distal end of the heating cylinder is not a negative pressure but substantially zero kg/cm$^2$.

9 Claims, 7 Drawing Figures

PLASTICATING CONTROL APPARATUS FOR INJECTION MACHINE

BACKGROUND OF THE INVENTION

The present invention relates to a plasticating control apparatus for controlling plasticating conditions to stabilize the temperature of a material to be plasticated, and molten and kneading states thereof in an injection machine.

Unlike an extrusion machine wherein a screw in a barrel (i.e., a heating cylinder) is continuously rotated, a screw in an in-line screw type injection machine periodically repeats rotation and stopping in accordance with a plasticating measuring operation and an injection action. During the plasticating process, since the screw is moved backward while a material, such as a molten resin, is being fed from a hopper, the effective length of the screw constantly changes. The temperature of the molten resin and the molten and kneading states thereof become nonuniform due to the basic operations described above, resulting in degradation of quality of finished products. In order to prevent this, conventionally, plasticating control is performed by controlling a backward movement speed of the screw during the plasticating process in the injection machine. In order to control the backward movement speed of the screw, various control apparatuses have been conventionally proposed wherein a rotational speed of the screw is adjusted to control the action of the molten resin fed in front of the screw, and simultaneously or independently, a back pressure of a hydraulic cylinder is adjusted to control the backward resistive force of the screw.

However, the backward resistive force is a sum of the back pressure of the hydraulic cylinder, a frictional force between the screw and the heating cylinder, a frictional force between the molten resin in the screw channel and the heating cylinder, a packing resistance in the hydraulic cylinder, and a sliding resistive force of a hydraulic motor unit. These forces interfere with the backward movement of the screw. The molten resin pressure must be equal to or higher than the backward resistive force. Even if the back pressure becomes zero, the molten resin pressure cannot be zero but has a given value. Therefore, when only the back pressure is controlled, plastication cannot be performed at a molten resin pressure lower than the back pressure. For example, when plasticating control is improper under the condition where the molten resin pressure is near zero, the backward movement of the screw is pulsated or the backward speed is locally decreased. In a worst case, depending upon the type of resin, the screw is stopped.

Furthermore, since the screw back pressure adjustment indirectly controls the backward speed of the screw, the adjustment itself is very difficult. Even if the back pressure of the screw is controlled, a time lag occurs in a hydraulic piping system due to changes in volumes caused by expansion/contraction of a working fluid and changes in pressures of the hydraulic piping system. The molten resin pressure cannot be immediately controlled, resulting in inconvenience. Furthermore, it is very difficult to control the backward resistive force depending upon the molding conditions and the type of resin supplied to a general-purpose screw.

SUMMARY OF THE INVENTION

It is, therefore, a principal object of the present invention to provide a plasticating control apparatus for an injection machine, wherein a backward speed of a screw can be controlled with high precision in a wide range varying from zero molten resin pressure.

It is another object of the present invention to provide a highly responsive plasticating control apparatus wherein a time lag caused by a hydraulic piping system can be eliminated.

It is still another object of the present invention to provide a simple plasticating control apparatus which can be easily applied in a conventional general-purpose injection machine.

In order to achieve the above objects of the present invention, there is provided a plasticating control apparatus for an in-line screw type injection machine, which includes a resin pressure sensor for detecting as an electrical signal a pressure of a molten material at a distal end of a heating cylinder during plastication; an electric motor whose rotational speed is controlled in response to a control signal; means for directly converting the rotational speed of the electric motor to reciprocal movement of a hydraulic piston for driving a screw; and a control circuit for receiving the electrical signal from the resin pressure sensor and supplying the control signal to the electric motor in accordance with the electrical signal, the control signal supplied from the control circuit to the electric motor being adapted to control the rotational speed of the electric motor and hence a backward speed of the screw such that the pressure of the molten material at the distal end of the heating cylinder is not a negative pressure but substantially zero kg/cm$^2$.

According to the plasticating control apparatus having the arrangement described above, when the screw is moved backward during plastication measurement, the electric motor can immediately respond to the control signal supplied from the control circuit. The rotation of the motor can be accurately transmitted to the hydraulic piston to smoothly move the screw backward, and the screw is free from the effects of slight hydraulic pressure changes and pulsation, an operation lag caused by compression of the working oil, and a resin pressure.

DETAILED DESCRIPTION OF THE PREFERRED EMBODIMENT

A plasticating control apparatus for an in-line screw type injection machine according to an embodiment of the present invention will be described with reference to the accompanying drawings.

Figure 1:
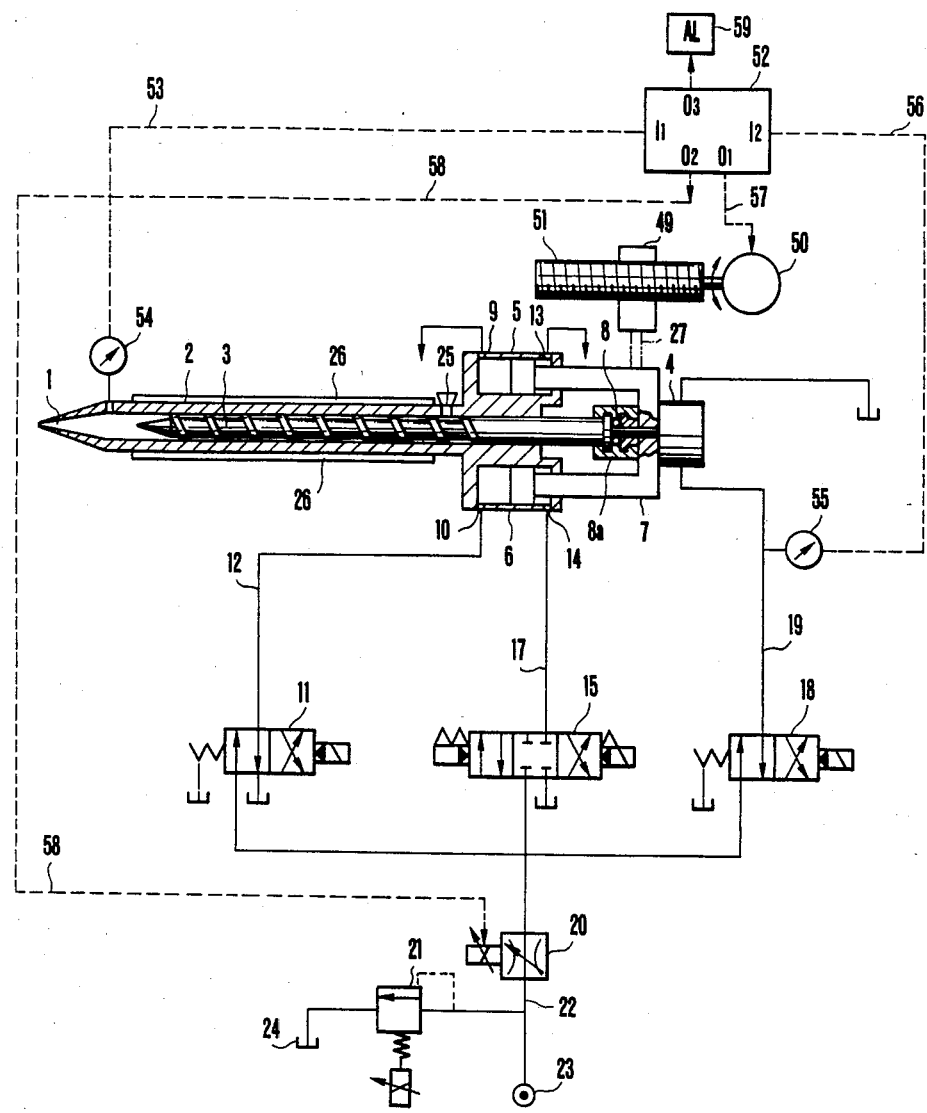
FIG. 1 is a diagram showing a plasticating control apparatus for an injection machine according to an embodiment of the present invention.

FIG. 1 shows the overall configuration of the in-line screw type injection machine according to the present invention. The solid line represents a hydraulic system, and the dotted line represents an electrical system. Referring to FIG. 1, a screw 3 is rotatably and reciprocally fitted in a heating cylinder 2 with a nozzle 1 at a distal end thereof. The screw 3 is coaxially mounted on a rotating shaft of a hydraulic motor 4 which is coupled to part of a piston rod 7 (to be described later) and reciprocally driven with respect to the heating cylinder 2. The outer surfaces of a pair of injection cylinders 5 and 6 are integrally formed with the heating cylinder 2. The screw 3 is rotatably supported through a thrust bearing 8 by the U-shaped piston rod 7 commonly used for the injection cylinders 5 and 6. Part of the screw 3 is coupled to part of the piston rod 7 at the thrust bearing 8 through a split coupling 8a. The screw 3 is freely rotated and is reciprocally moved together with the piston rod 7. A hydraulic pipe 12 having a selector valve 11 is connected to head end ports 9 and 10 of the injection cylinders 5 and 6. A hydraulic pipe 17 having a selector valve 15 is connected to rod end ports 13 and 14 of the injection cylinders 5 and 6. A hydraulic pipe 19 having a selector valve 18 is connected to the hydraulic motor 4. The hydraulic pipe 19 and the hydraulic pipes 12 and 17 merge and are connected to a hydraulic pump 23 and a hydraulic tank 24 through a hydraulic pipe 22 having a flow control valve 20 and a relief valve 21. A hopper 25 is disposed near the proximal portion of the screw 3 to supply resin between the screw 3 and the heating cylinder 2. A heater 26 is arranged around the heating cylinder 2 to heat the resin between the screw 3 and the heating cylinder 2.

A servo motor (e.g., a pulse motor) 50 and a screw rod 51 coupled thereto are threadably engaged with a female threaded member 49 fixed on the piston rod 7. When the motor 50 is rotated, the screw 3 is reciprocally moved through the piston rod 7 by the threadable engagement.

Figure 6:
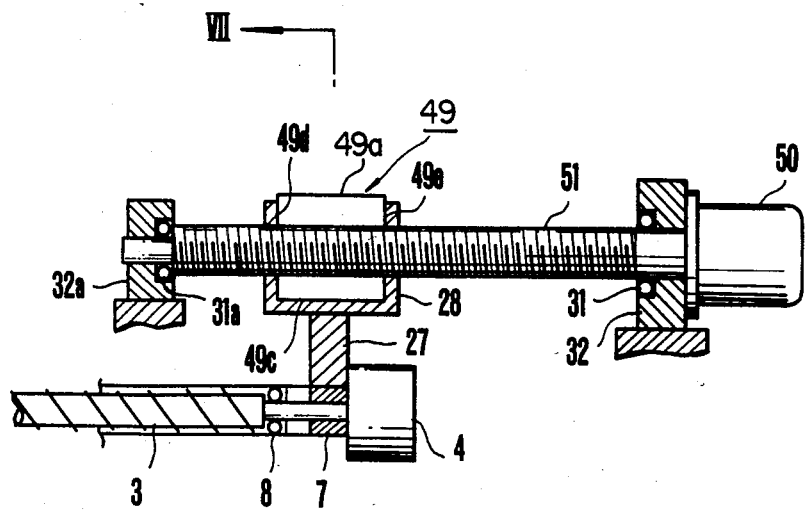
FIGS. 6 and 7 are respectively horizontal and vertical sectional views showing a coupling structure between an electric motor and a piston rod according to another embodiment of the present invention.
Figure 7:
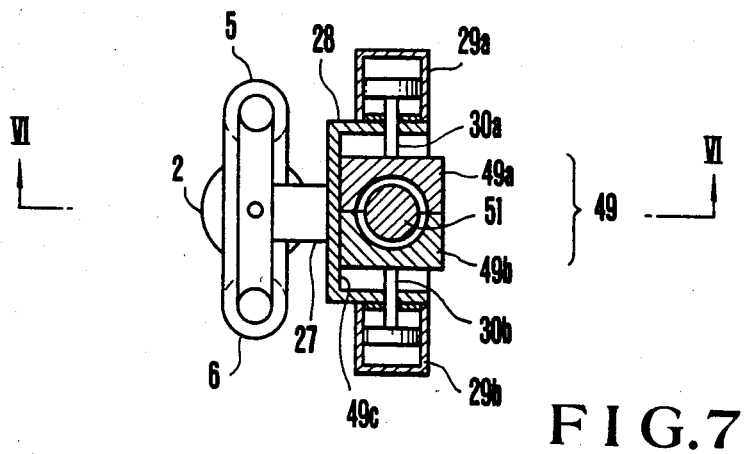

FIGS. 6 and 7 show another embodiment showing a coupling structure between a screw rod 51 and a female threaded member 49. The female threaded member 49 shown in FIG. 1 is always threadably engaged with the screw rod 51. However, in the embodiment shown in FIGS. 6 and 7, the screw rod 51 is threadably engaged with or disengaged from the female threaded member 49. FIG. 6 is a sectional view of the coupling structure taken along the line VI—VI of FIG. 7, and FIG. 7 is a sectional view thereof taken along the line VII—VII of FIG. 6.

Referring to FIGS. 6 and 7, a box 28 is fixed on one side surface of the piston rod 7 through a bracket 27. The female threaded member 49 is composed of rectangular split nuts 49a and 49b. The outer surfaces of these rectangular split nuts 49a and 49b slidably contact with the inner surface of the box 28. A surface 49c of the female threaded member 49 is in tight contact with the bottom surface of the box 28 so as to prevent the female threaded member 49 from rotation when the screw rod 51 rotates. Outer surfaces 49d and 49e of the female threaded member 49 along the axial direction thereof are in tight contact with the corresponding inner wall surfaces of the box 28 along the axial direction, so that the female threaded member 49 is moved together with the box 28 along the axial direction.

Cylinders 29a and 29b are respectively fixed on the outer surfaces of the box 28. The distal ends of piston rods 30a and 30b of the cylinders 29a and 29b are fixed on the split nuts 49a and 49b, respectively. With this structure, the piston rods 30a and 30b of the cylinders 29a and 29b are simultaneously reciprocated to engage or disengage the split nuts 49a and 49b with or from the screw rod 51. The screw rod 51 is rotatably supported by fixing members 32 and 32a through respective bearings 31 and 31a. The servo motor 50 is mounted on the fixing member 32.

The female threaded member is operated in the following manner.

When the piston rods 30a and 30b of the cylinders 29a and 29b are moved forward, the split nuts 49a and 49b are threadably engaged with the screw rod 51. In this state, when the servo motor 50 is started, the screw rod 51 is rotated, and the female threaded member 49 constituted by the split nuts 49a and 49b is moved together with the box 28 along the axial direction. As a result, the piston rod 7 of the cylinders 5 and 6 is moved forward and backward.

However, when the piston rods 30a and 30b of the cylinders 29a and 29b are moved backward, the split nuts 49a and 49b are disengaged from the screw rod 51. Upon operation of the cylinders 5 and 6, the female threaded member 49 is moved forward and backward together with the piston rod 7.

The female threaded member 49 is threadably engaged with the screw rod 51 so that the screw 3 is moved backward upon operation of the servo motor 50 during plastication measurement. The female threaded member 49 is disengaged from the screw rod 51 so that the screw 3 is moved forward only by behavior of the cylinders 5 and 6 during injection.

A molten resin pressure sensor 54 is arranged to detect a pressure of the molten resin at the distal end of the heating cylinder 2. A load pressure sensor 55 is arranged midway along the hydraulic pipe 19 to detect a load of the hydraulic motor 4. Outputs from the sensors 54 and 55 are supplied to input terminals I1 and I2 of a control circuit 52 through signal lines 53 and 56, respectively. The control circuit 52 stores a control program and performs predetermined operations in response to the signals from the sensors 54 and 55 in accordance with the control program. An output O1 from the control circuit 52 is supplied to the servo motor 50 through a signal line 57, and an output O2 therefrom is coupled to the flow control valve 20 through a signal line 58. An output O3 from the control circuit 52 is coupled to an alarm generator 59.

The operation of the injection machine having the arrangement described above will be described hereinafter.

The resin is supplied from the hopper 25 to the proximal portion of the screw 3 after the piston rod 7 is moved backward into the cylinders 5 and 6 and the screw 3 is moved forward. The selector valves 15 and 18 are switched to rotate the hydraulic motor 4 to connect the ports 9, 10, 13 and 14 to the hydraulic tank 24. The molten resin is plasticated and kneaded upon rotation of the screw 3 and is fed to the front portion of the heating cylinder 2. The screw 3 is gradually moved backward according to the pressure of the molten resin. It should be noted that the screw 3 is moved backward by the servo motor 50 at a predetermined backward speed in a manner to be described later. When the screw 3 is moved backward by a stroke corresponding to the predetermined volume of the molten resin, a limit switch (not shown) is started to stop rotation and backward movement of the screw 3. The plasticated material is temporarily stored at the distal end portion of the heating cylinder 2. When a molded product for the previous cycle is released from the molds and the molds are closed, the selector valve 15 is switched to supply the working fluid to the ports 13 and 14. The screw 3 is moved forward to inject the molten resin from the distal end portion into the mold cavities. The injected resin is cooled in the molds, and plasticating measurement for the next cycle is performed.

In the above process, the control circuit 52 receives detection signals from the sensors 54 and 55 while the screw 3 is being moved backward. The control circuit 52 then performs the predetermined operation in response to these detection signals. The control circuit 52 supplies the backward speed control signal to the servo motor 50 and the rotational speed control signal for the screw 3 to the flow control valve 20.

When the backward speed of the screw 3 is low in comparison with the rotational speed thereof, the backward movement of the screw 3 is prevented by a frictional force between the screw 3 and the heating cylinder 2, a frictional force between the molten resin in the channel of the screw 3 and the heating cylinder 2, the forward movement (in the right direction in FIG. 1) of the piston rod 7 in the cylinders 5 and 6, and a sliding resistive force of the rotating shaft of the hydraulic motor 4. In this case, when the pressure of the molten resin in the distal end portion of the heating cylinder 2 is higher than a predetermined threshold value, the control circuit 52 supplies a screw backward speed control signal to the servo motor 50. The servo motor 50 rotates the screw rod 51 at a speed represented by the signal supplied from the control circuit 52. Upon rotation of the screw rod 51, the female threaded member 49 is moved together with the screw rod 51 along the axial direction. As a result, the piston rod 7 moves the screw 3.

However, when the backward speed of the screw 3 is high in comparison with the rotational speed thereof, the following operation is performed. When the pressure of the molten resin is lower than the predetermined threshold value upon absorption of air from the nozzle 1, the screw backward speed control signal is supplied to the servo motor 50. The servo motor 50 rotates the screw rod 51 at the rotational speed represented by the signal supplied from the control circuit 52. Upon rotation of the screw rod 51, the female threaded member 49 is moved together with the screw rod 51 along the axial direction. The screw 3 is, thus, moved by the piston rod 7.

When the resin is not supplied to the proximal portion of the screw 3 due to shortage of the resin material in the hopper 25 or the bridge phenomenon, the load of the hydraulic motor 4 is decreased. A decrease in the load is detected by the sensor 55. The control circuit 52 supplies the signal to the flow control valve 20 in response to the detection signal supplied from the sensor 55, thereby stopping rotation and backward movement of the screw 3. At the same time, a signal is supplied to the alarm generator 59 which generates an alarm sound.

Figure 2:
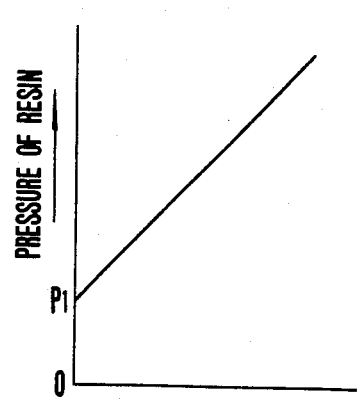
FIGS. 2 to 5 are, respectively, graphs for explaining differences between the operations of the apparatus of the present invention and the conventional apparatus.
Figure 4:
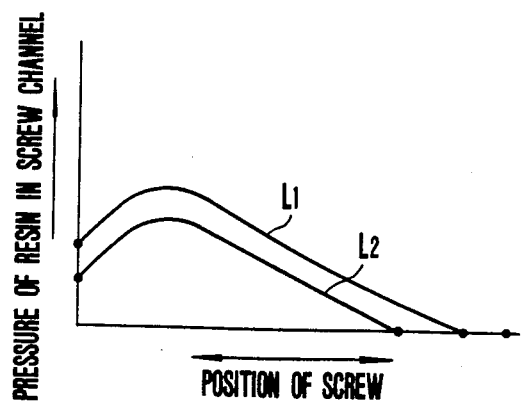
Figure 3:
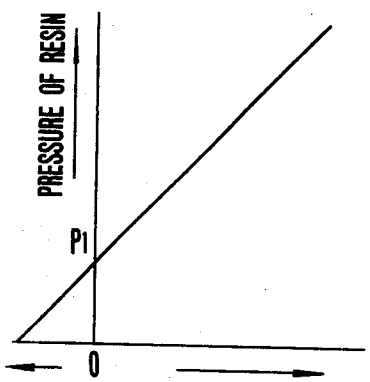
Figure 5:
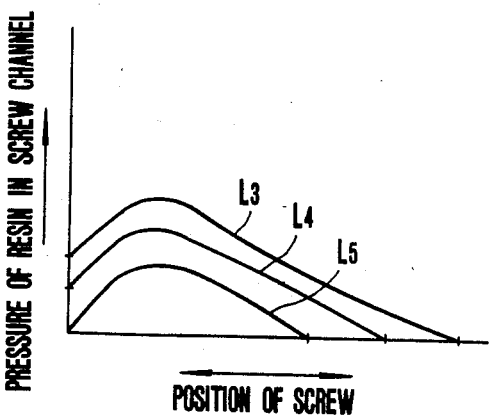

The backward movement of the screw 3 will be described in more detail in order to allow better understanding of the above control operation. Referring to FIGS. 2 and 3, the pressure of the molten resin stored in front of the screw 3 is plotted along the ordinate, and the screw backward resistive force caused by the screw back pressure is plotted along the abscissa. FIG. 2 shows the case of the conventional injection machine, and FIG. 3 shows the case of the injection machine according to the present invention. Referring to FIGS. 4 and 5, the resin pressure in the screw channel is plotted along the ordinate, and the screw position in the heating cylinder 2 is plotted along the abscissa. FIG. 4 shows the case of the conventional injection machine, and FIG. 5 shows the case of the injection machine of the present invention. As is apparent from FIGS. 2 and 3, in the conventional injection machine, the resin pressure adjustment range starts from P1 (=20 to 30 kg/cm$^2$ in a normal thermoplastic resin) by adjusting the screw resistive force added to the screw back pressure. However, according to the present invention wherein the backward drive force of the screw 3 is controlled upon detection of the molten resin pressure and the load of the hydraulic motor 4, the resin pressure adjustment range starts from zero. Unlike the conventional back pressure control wherein the backward resistive force acting on the screw is positive, the backward resistive force acting on the screw 3 according to the present invention is not only positive but also negative. In other words, the backward movement of the screw 3 is reinforced. As a result, stable plastication can be provided without pulsation and decrease in the backward speed of the screw 3 and stoppage of the screws backward movement. Stable plastication is observed as changes occur in the resin pressure in the screw channel during plastication and the results are illustrated in FIG 5 as a comparison with the conventional case of FIG 4. Referring to FIGS. 4 and 5, the right-hand side indicates the side of the hopper 25, and the left-hand side indicates the side of the distal end of the screw 3. A curve L1 in FIG. 4 is derived when the screw back pressure is present and a curve L2 is derived when the screw back pressure is not present in FIG. 4; and a curve L3 in FIG. 5 is derived when the backward resistive force acting on the screw 3 is present, a curve L4 in FIG. 5 is derived when an external force (i.e., the backward resistive force) acting on the screw 3 is zero, and a curve L5 in FIG. 5 is derived when the backward movement is reinforced according to the present invention.

The material fed from the hopper 25 must be transported toward the front portion of the screw 3 against the pressure of the resin filled in the screw channel. As is apparent from FIG. 5, the resin can be easily fed when the acting pressure start position is remote from the side of the hopper 25 and the resin pressure is small.

The effect of the present invention is represented by the curve L5 in FIG. 5 and the resin can be easily fed as compared with the conventional case of FIG. 4. Pulsation of the backward movement of the screw 3, decrease in backward speed thereof, and stoppage occur when the thrust is weak in the feed zone of the molten resin. Therefore, these drawbacks can be prevented by the performance represented by the curve L5.

The relationship between the load pressure of the hydraulic motor 4 and the backward speed of the screw 3 will be considered as follows. Since the screw 3 in the in-line screw type injection machine is not continuously rotated but subjected to intermittent rotation, heat energy is applied to the resin in the screw 3 to decrease its viscosity while the screw 3 is stopped. In this state, the load pressure of the hydraulic motor 4 is low at the beginning of plastication process. While the screw 3 is being rotated, new resin is always being fed from the hopper 25 to the screw 3. The temperature of the resin in the screw 3 is decreased to an extent corresponding to the feed rate and the viscosity of the resin is increased to gradually increase the load pressure of the hydraulic motor 4 at the beginning of plastication measurement.

The screw 3 is moved backward when the molten resin is fed in front of the screw 3 upon rotation. In the latter half of plastication measurement, the load pressure of the hydraulic motor 4 is decreased. When the hydraulic motor 4 is rotated with a low load pressure, mechanical energy applied to the molten resin is decreased. In order to decrease the backward speed of the screw 3 so as to compensate for the decrease in mechanical energy, the time period for passing the resin through the channel of the screw 3 is prolonged as compared with the case wherein the load pressure of the hydraulic motor 4 is high. In accordance with the relationship given such that (mechanical energy applied to the resin)=(screw load pressure)×(time for causing the resin to pass through the screw channel), the load pressure of the screw 3 is detected by the load pressure sensor 55 and the backward speed of the screw 3 is calculated to apply a predetermined energy per unit volume of the resin. Therefore, changes in temperature of the plasticated resin material and its dispersion state can be decreased. When the rotational speed of the screw 3 is controlled while the backward speed of the screw 3 is being controlled, the molding range can be further widened.

What is claimed is:

1. A plasticating control apparatus for an in-line screw type injection machine, comprising: a resin pressure sensor for detecting as an electrical signal a pressure of a molten material at a distal end of a heating cylinder during plastication; an electric motor whose rotational speed is controlled in response to a control signal; means for directly converting the rotational speed of said electric motor to reciprocal movement of a hydraulic piston for driving a screw; and a control circuit for receiving the electrical signal from said resin pressure sensor and supplying the control signal to said electric motor in accordance with the electrical signal, the control signal supplied from said control circuit to said electric motor being adapted to control the rotational speed of said electric motor and hence a backward speed of the screw such that the pressure of the molten material at the distal end of said heating cylinder is not a negative pressure but substantially zero kg/cm$^2$.

2. An apparatus according to claim 1, further comprising a load pressure sensor for detecting as an electrical signal a load pressure of a hydraulic motor for driving said screw, and for supplying the electrical signal to said control circuit, said control circuit being adapted to control the backward speed of said screw in accordance with output signals from said load pressure sensor and said resin pressure sensor.

3. An apparatus according to claim 2, wherein said control circuit stops said hydraulic motor and starts an alarm generator when the load pressure of said hydraulic motor is lower than a predetermined threshold value.

4. An apparatus according to claim 1, wherein said converting means comprises a screw rod integrally mounted with an output shaft of said electric motor to be parallel to a reciprocal direction of said hydraulic piston, and a female threaded member threadably engaged with said screw rod and integrally mounted with said hydraulic piston.

5. An apparatus according to claim 4, wherein said female threaded member has a two-split structure so as to engage or disengage said female threaded member with or from said screw rod.

6. A plasticating control apparatus for an in-line screw type injection machine, comprising: a resin pressure sensor for detecting as an electrical signal a pressure of a molten material at a distal end of a heating cylinder during plastication; a load pressure sensor for detecting as an electrical signal a load pressure of a hydraulic motor for driving said screw; an electric motor whose rotational speed is controlled in response to a control signal; means for directly converting the rotational speed of said electric motor to reciprocal movement of a hydraulic piston for driving a screw; and a control circuit for receiving the electrical signals from said resin pressure sensor and said load pressure sensor, calculating a predetermined rotational speed of said electric motor in accordance with the electrical signals, and supplying the control signal representing the predetermined rotational speed to said electric motor.

7. An apparatus according to claim 6, wherein said control circuit stops said hydraulic motor and starts an alarm generator when the load pressure of said hydraulic motor is lower than a predetermined threshold value.

8. An apparatus according to claim 6, wherein said converting means comprises a screw rod integrally mounted with an output shaft of said electric motor to be parallel to a reciprocal direction of said hydraulic piston, and a female threaded member threadably engaged with said screw rod and integrally mounted with said hydraulic piston.

9. An apparatus according to claim 8, wherein said female threaded member has a two-split structure so as to engage or disengage said female threaded member with or from said screw rod.

* * * * *